United States Patent [19]

Lee

[11] 4,091,653

[45] May 30, 1978

[54] TURBINE METER IN-LINE CHECKING APPARATUS AND METHOD

[75] Inventor: Winston F. Z. Lee, Delmont, Pa.

[73] Assignee: Rockwell International Corporation, Pittsburgh, Pa.

[21] Appl. No.: 798,147

[22] Filed: May 18, 1977

[51] Int. Cl.² .............................................. G01F 25/00
[52] U.S. Cl. .............................................. 73/3; 73/231 R
[58] Field of Search ................... 73/3, 231 R, 231 M

[56] References Cited

U.S. PATENT DOCUMENTS

| | | |
|---|---|---|
| 3,142,179 | 7/1964 | Souriau .................................. 73/231 |
| 3,550,426 | 12/1970 | Griffo ......................................... 73/3 |
| 3,795,131 | 3/1974 | Wade .......................................... 73/3 |

Primary Examiner—S. Clement Swisher

[57] ABSTRACT

This invention discloses apparatus and method for checking the calibration of a fluid turbine meter without interrupting the line service. A flow directions sensing means is inserted at the downstream side of the flowmeter so that the angle of flow the discharge from the meter may be checked from time to time without removing the meter from its flow line. Any change in this angle indicates a possible change in response of the meter.

16 Claims, 4 Drawing Figures

TURBINE METER IN-LINE CHECKING APPARATUS AND METHOD

FIELD OF THE INVENTION

This invention relates to apparatus and method of checking turbinetype flow meters for accuracy.

BACKGROUND OF THE INVENTION

The turbine-type flow meter has been used for many years in the measurement of fluids. Interest in this type of meter has greatly increased in recent years. One of the reasons for this increased interest is the proven reliability of the turbine type flow meter when it is correctly designed and properly applied. It has a high degree of repeatability when the meter operates within its normal range and when it is in good physical condition.

It is generally accepted in the gas industry that the accuracy of gas turbine meters is established by calibration, usually in the manufacturer's facility. Once a meter has been calibrated, it is important to have some method which can determine whether this accuracy is being maintained in the field.

The best way for the meter user to check the meter accuracy is to have a calibration stand of his own. However, in order to utilize a calibration stand, the meter (or at least the measuring rotor) must be removed from the service line in which it is installed. This is not always convenient, or even possible at some times.

OBJECTS OF THE INVENTION

A major object of this invention is to provide for a novel apparatus and method which is simple, practical and efficient for reliably checking the accuracy of a turbine type flow meter while the meter remains in service, without interrupting the flow in the service line.

The apparatus of this invention provides a means for taking measurements which then can be compared with previous measurements to determine if there has been a change in meter accuracy. This apparatus, part of which is designed to be built into each meter, is used at the factory before shipping to the customer to measure the fluid exit angle while the meter is being calibrated. Turbine meter analysis indicates that any deviation from the initial calibration value of the average fluid exit angle is uniquely related to the amount of deviation of the meter coefficient from its initial calibration value. This deviation is unique because it is practically independent of fluid flow rate or line pressure or temperature.

Accordingly, this relationship between the exit angle, which is the amount of deflection of the fluid as a result of contact with the blades of the measuring turbine, and the meter coefficient can be used to check turbine meters without interrupting customer service. The present invention provides means for obtaining these measurements that enable the foregoing comparison.

One method of detecting the average fluid exit angle is the use of two small flow direction-detecting cylindrical pitot tubes, both inserted radially into the meter and perpendicular to the longitudinal axis of the meter. The tubes are identical in construction, each having two holes separated a finite angular distance apart on a plane parallel to the axis of the meter. Each hole is connected to piping which transmits the pressure to the outside of the meter. One tube is inserted into the flow passage upstream of the metering rotor, while the other is located downstream. Thus, the change in flow direction can be measured when desired. Each pitot has its piping connected to a suitable means for measuring the differential pressures on the respective holes in the pitot. The tube is then rotated until an average zero differential pressure exists between the two holes of each pitot. The bisector of the angle between the holes will then give the flow direction. The change in angle between the fluid entering and leaving the metering rotor is the average deflection angle, or the exit angle.

An absolute shaft angle encoder connected to each pitot can be used to display the angle the flow direction makes with the longitudinal axis of the meter. After the difference of the two readings is calculated to arrive at the average exit angle, this can be compared with the value established during the initial meter calibration, which would then indicate any change in meter accuracy.

With the foregoing in mind, another important object of this invention is to provide a novel method and apparatus which provides a measurement of a variable that may be compared with a reference value to determine if the accuracy of the turbine meter has been impaired, without interrupting the service in which the meter is being utilized.

Another object of this invention is to provide a means of removably attaching measuring instruments to a turbine meter and ascertaining any change in the meter calibration without permanently fixing the instruments to any one meter.

DESCRIPTION OF A PREFERRED EMBODIMENT

Figure 2:
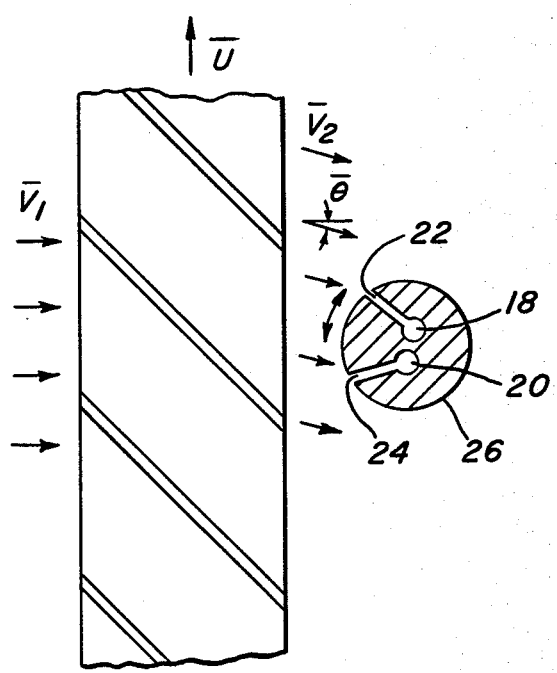
FIG. 2 is a diagram of the measuring rotor of a turbine meter and a directional pitot in place downstream, with arrows showing the fluid flow.

Basic to an understanding of this invention is recognition of the significance of the term "exit angle" as applied to the flow of fluid through the metering rotor. Referring to FIG. 2, the arrows designating the flow through the rotor are used to illustrate the change of direction of the flow, designated as $\bar{\theta}$. In this drawing, the flow is from left to right, and the upstream flow is drawn as axial in direction; i.e., parallel to the longitudinal axis of the meter. It has been found that the average exit angle, which here is illustrated as $\bar{\theta}$, is practically independent of flow rate, line pressure and temperature. As stated above, any deviation of this exist angle (or deflection angle) from the initial calibration value of this average fluid exit angle is uniquely related to the amount of deviation of the meter coefficient from its initial calibration value. Because this value is practically independent of flow rate, line pressure and temperature, this exit angle $\bar{\theta}$ can be measured even while the meter is in service, without interrupting the flow. A comparison of value of $\bar{\theta}$ determined during field checking with the initial value of $\bar{\theta}$ during the calibration tests at the factory will then indicate any change in this meter accuracy.

The apparatus necessary to obtain this exit angle $\bar{\theta}$ may be installed on axial-flow turbine meters generally, but the description herein refers to a meter as shown in U.S. Pat. No. 3,858,448 issued Jan. 7, 1975, to which reference may be had for an understanding of the meter structure and its operation.

Figure 1:
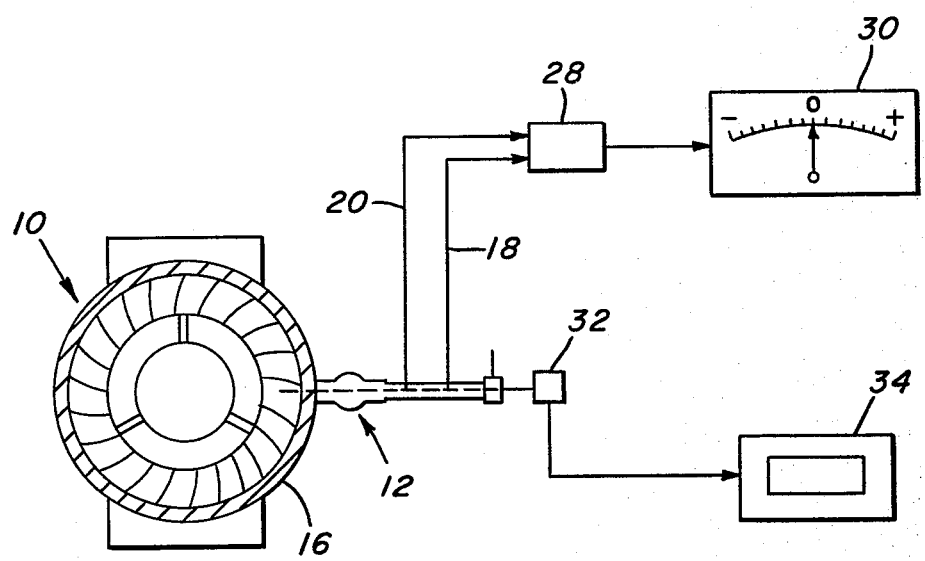
FIG. 1 is a schematic diagram of the apparatus in place on a turbine meter, also shown schematically.
Figure 3:
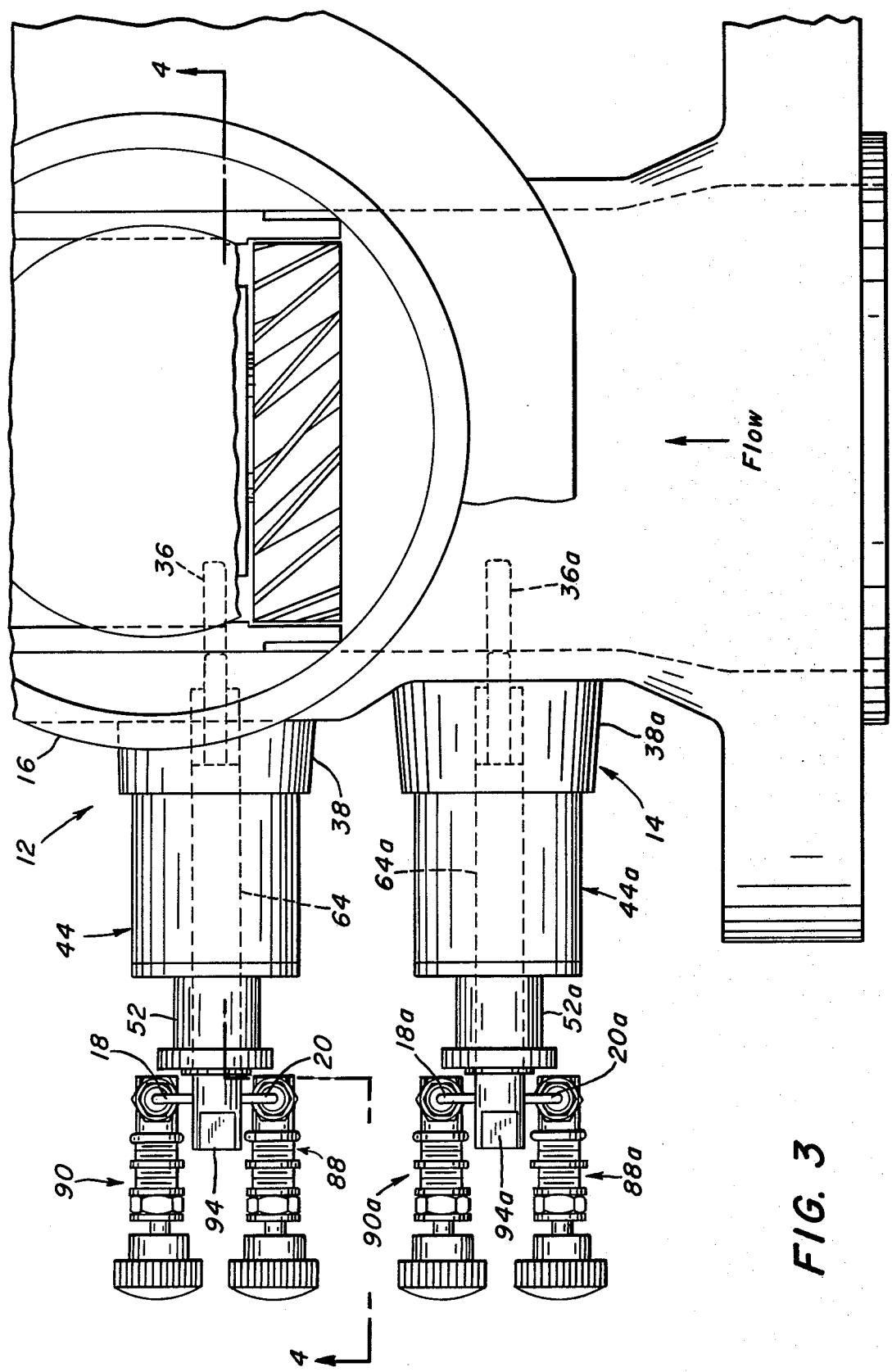
FIG. 3 is a top view of a portion of a turbine meter, partially in section, to show the probe installation and the connections to them.

FIG. 1 is a schematic diagram of a portion of the apparatus in place on a turbine meter 10. As seen in FIG. 3, two identical probes are used. Upstream probe assembly 14 is identical in operation and construction to downstream probe assembly 12, so only the downstream assembly will be described herein. Referring back to FIG. 1, the probe assembly 12 is shown installed in the sidewall of the meter housing 16. It has two tubing lines 18 and 20 connected to the respective sensing holes 22 and 24 (FIG. 2) of the cylindrical pitot tube 26. These holes are desirably on the order of 75 degrees to 85 degrees apart around the circumference of the tube 26 and are in a common plane parallel to the axis of the meter. Tubing lines 18 and 20 are connected to a differential pressure transducer 28 for ascertaining a rotative point of minimum differential pressure between the holes 22 and 24. The transducer 28 may be of any of a number of commercially available type having a suitable pressure range for the type of service in which the meter is installed. The transducer 28 is coupled to an electronic manometer, illustrated diagrammatically at 30, for observing the null, or average zero differential in pressure in the transducer.

In order to measure the angular orientation of the pitot, a shaft angle encoder 32 is fixed to the outer end of the pitot tube 26. An electronic digital display 34 of the angle (which is the desired "exit angle" in most cases) is coupled to the shaft angle encoder 32.

Because it is not necessary to continuously monitor the calibration, but merely to check it at occasional periods, the probes or pitot tubes 26 are designed to be withdrawn from the flowing fluid, to minimize the chance of plugging the pitot holes. Additionally, the instruments, namely the transducer 28, manometer 30, shaft angle encoder 32, and digital display 34, are designed to be selectively coupled to and removed from desired pitot tubes, for utilizing the instruments to check more than one meter.

Figure 4:
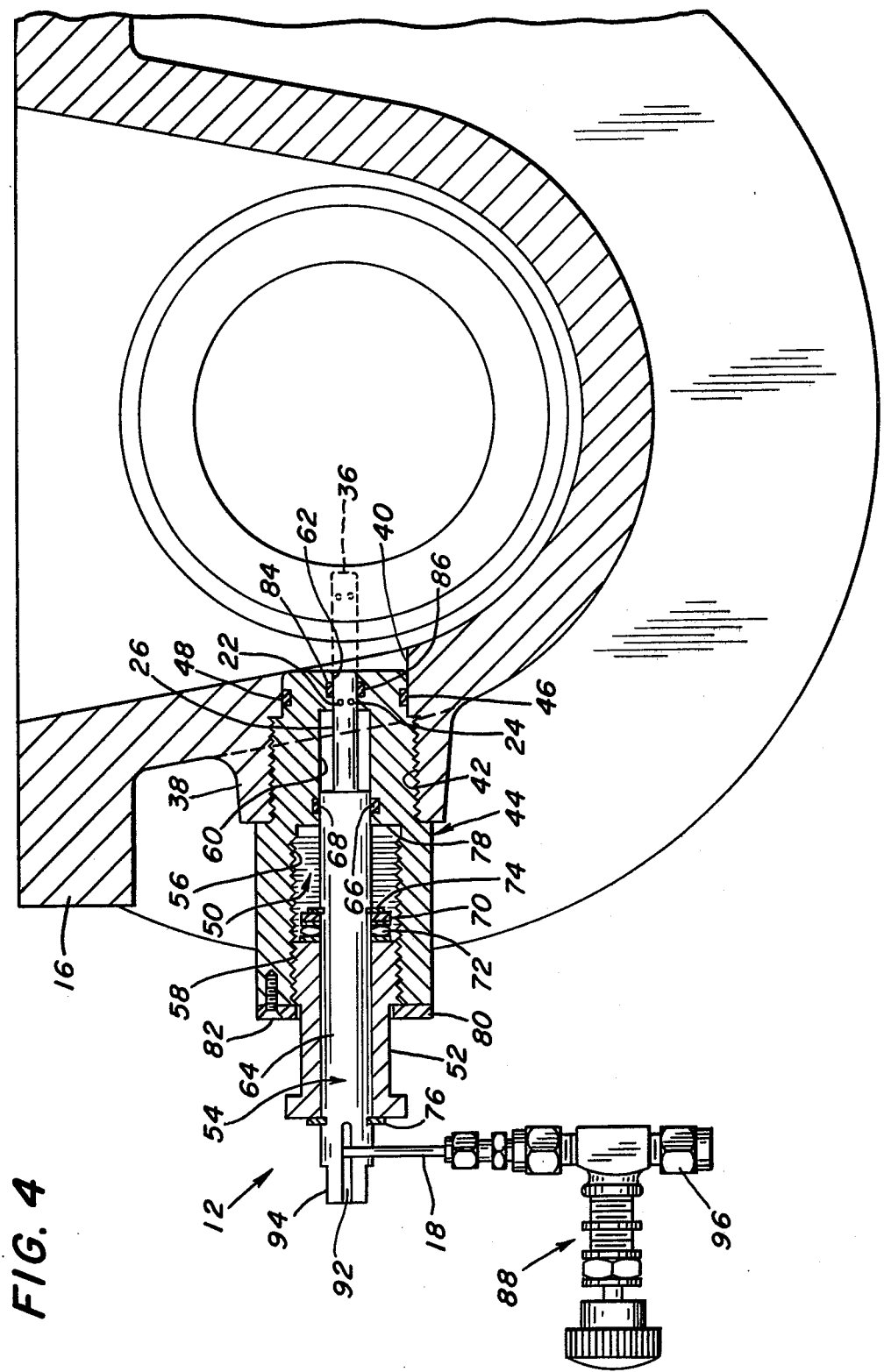
FIG. 4 is a sectional view normal to the longitudinal axis of the meter with some elements omitted for clarity, taken along the line 4-4 of FIG. 3.

The apparatus fixed to the meter, and which remains thereon, can be seen in FIGS. 3 and 4. FIG. 3 shows upstream probe assembly 14 and downstream probe assembly 12 in the retracted, or withdrawn position. They are maintained in this position except when a reading is desired, to minimize the likelihood of debris or the like clogging the pitot tubes. When a reading is desired, the pitots are inserted to the positions 36 and 36a in dotted lines in FIGS. 3 and 4.

Before beginning the description of these probe assemblies, it should be re-emphasized that both probe assemblies 12 and 14 are identical in construction and in operation, so only the downstream probe assembly 12 will be described herein, and like parts on probe assembly 14, seen in FIG. 3, will carry like numerical identification with the suffix "a" after the numbers.

In this connection, it has been found that turbine meter installations are designed to provide purely axial flow at the metering rotor. To this end, the run of pipe upstream should be straight for some distance, and straightening vanes are commonly installed. Accordingly, it has been found that the installation of upstream probe assembly often does not add any significant additional accuracy, and may be omitted.

The downstream probe assembly 12 is mounted on a boss 38 provided on the side of the meter. A through stepped bore 40 (FIG. 4) is threaded in its outer end, as at 42, for reception of a plug member 44. The inner end of plug 44 carries a seal member, such as an O-ring 46, in a recess 48, to seal between housing 16 and plug 44. Plug 44 itself has a stepped through bore 50 for reception of sleeve member 52 and pitot assembly 54. The bore 50 is threaded in its outer largest diameter 56, for reception of the threaded exterior portion 58 of sleeve 52. Bore 50 has two successively smaller diameter portions 60 and 62 respectively proceeding toward the inner end of the plug member 44. Bore 60 is dimensioned to closely receive shell portion 64 of the pitot assembly 54, and has a recess 66 which receives an O-ring seal 68 for making the assembly fluid-tight. Shell 64 is fixed to sleeve member 52 for inward and outward movement, but allowing relative rotation for screwing sleeve member 52 in and out by means of threads 56 and 58, and also for the rotation of the pitot for a purpose to be discussed later. In this embodiment, the shell 64 is fixed to sleeve member 52 by spacer 70, thrust bearing 72, and retainer rings 74 and 76. Thus, as sleeve member 52 is threaded into plug member 44, it moves pitot assembly 54 inward with it without rotating the pitot assembly. When retainer ring 74 abuts shoulder 78 between the threaded bore 56 and bore 60, the pitot tube 26 is in the dotted line position 36. After measurements have been taken, sleeve member 52 may be threadedly withdrawn until the threaded portion 58 encounters cover member 80, which is held on plug member 44 by screws 82. This cover may be a split member or of other suitable configuration. When the pitot assembly is in this withdrawn position, shown in solid lines on FIG. 4, a seal 84 mounted in recess 86 protects the holes 22 and 24 from the line fluid, minimizing the possibility of clogging the holes with fluid-carried debris. This seal also helps seal off the body of the meter, preventing leakage therefrom.

As mentioned above, pitot tube 26 has two tubing lines 18 and 20, connected to respective sensing holes 22 and 24. These tubing lines come out of the rear of shell 64 to shut-off valves 88 and 90. The tubing lines are designed to come through opposite sides of a slot 92 in the rear of shell 64, in order to leave the rear extremity of shell 64 free for attachment of shaft angle encoder 32. The end of shell 64 has been shown with a noncircular configuration 94 to assure proper coupling with the shaft angle encoder. The valves 88 and 90 are also equipped with suitable tubing connectors 96 to make connection with the differential pressure transducer.

The differential pressure transducer 28, its readout display 30, the shaft angle encoder 32, and the electronic angle display 34, are all commercially available products and need not be described here. Suffice it to say that the transducer 28 must have the proper sensitivity, stability and pressure rating for the service in which it is to be used, and the shaft angle encoder 32 must be sensitive enough to give angular readings to the nearest tenth of a degree.

To use this invention, the meter 10 is assembled at the factory, then the removable elements are connected to the shut-off valves 88 and 90 and to the end of shell 64. During the calibration testing of the meter, the exit angle $\bar{\theta}$ is measured and recorded. Upon completion of the meter certification in the factory, the removable elements (transducer 28, manometer 30, shaft angle encoder 32 and angle display 34) are disconnected from the meter, the sleeve member 52 is threadedly withdrawn so that pitot tube 26 is retracted to the position shown in solid lines in FIG. 4, and the meter is ready to be sold and installed in the field, so far as this invention is concerned with it.

Subsequently, when it is desired to check the meter calibration, the meter need not be removed from service. The removable elements listed above are connected, the sleeve 52 is threaded into the plug 44 until retainer ring 74 abuts shoulder 78, then the components are in position to measure the exit angle. Upon completion of the measurement of the exit angle, the amount of angular deviation from the initially measured angle at the time of factory calibration of the meter, if any is measured, is in direct linear relation to the meter calibration. Each design of turbine meter and each size of each design has meter characteristics, such as the angle of the blades on the rotor with a longitudinal axial plane of the meter, which determine the relationship. For example, on the Rockwell Mark II four inch Model T-18 turbine meter, it was calculated that the percentage change in meter proof for each degree of change in exit angle was 2.26%. Subsequent testing established this figure was 2.15%. This means, for every tenth of a degree change in the exit angle, the meter proof changes by 0.22% and the meter reading could be adjusted accordingly, if so desired. In any event, it is a means for checking the meter calibration, to determine if it is within the allowable limits of error for the usage in which it is installed, or if it needs to be removed from the line and replaced.

In some installations, where any uncertainty exists about the direction of flow entering the blades of the metering rotor, the installation shown in FIG. 3 will be used. In FIG. 3, the fluid flow is from bottom to top and the upstream probe assembly 14 is operated in the same manner as the forgoing description for downstream probe assembly 12. The difference in the angular readings between the two probe assemblies is then the change caused by the rotor, which is the exit angle of the fluid.

Thus, I have invented a novel method of checking the accuracy of turbine meters and the apparatus for performing this check.

What is claimed:

1. In combination, a turbine meter having a rotary turbine wheel comprised of spaced turbine blades, sensing means responsive to the direction of fluid flow leaving said blades for measuring the deflection, or exit, angle of said flow, and signal means for utilizing said exit angle.

2. The combination of claim 1 wherein said signal means is an indicator of the registration accuracy of said turbine meter.

3. In combination, a turbine meter having a rotary turbine wheel comprised of spaced turbine blades, sensing means responsive to the direction of fluid flow leaving said blades for measuring the exit angle of said flow, and indicating means for indicating said exit angle which is an indicator of the registration accuracy of said meter.

4. The invention of claim 3 in which said sensing means is comprised of a pitot tube having angular spaced openings generally in the path of the flow of fluid leaving said turbine blades; said pitot tube being rotatable to a position where said fluid flow produces a null or minimum pressure differential between said openings.

5. The invention of claim 4 together with means to measure the pressure differential between said openings.

6. Apparatus for ascertaining the accuracy of a fluid flow meter having a rotary measuring turbine wheel comprised of spaced turbine blades, said apparatus comprising sensing means responsive to the direction of fluid flow leaving said turbine blades, for ascertaining the exit angle of said fluid flow, and indicating means for indicating said exit angle, whereby said exit angle is an indicia of meter accuracy.

7. The apparatus of claim 6 wherein said sensing means comprises a directional pitot tube having angularly spaced-apart hole.

8. The apparatus of claim 6 wherein said pitot tube is radially movable for insertion into and withdrawal from said fluid flow.

9. The apparatus of claim 7 wherein said directional pitot tube is connected to a differential pressure transducer for obtaining the null, or minimum, differential pressure on said holes in said pitot tube.

10. The apparatus of claim 7 wherein said indicating means comprises an absolute shaft angle encoder for determining and indicating the rotational position of said directional pitot tube at said null position.

11. Apparatus for checking the accuracy of a fluid flow turbine meter without interrupting normal flow operation or removing said turbine from its service installation, comprising, a cylindrical flow direction-detecting pitot tube adapted to be inserted radially into said meter downstream of the rotor of said turbine, said tube having a pair of openings aligned in a plane perpendicular to the probe axis, a differential pressure transducer connected to said pair of openings, and a shaft angle encoder connected to said pitot cylinder externally of said meter.

12. A turbine meter having a housing with a fluid flow passage therethrough and a bladed rotor mounted in said flow passage, the improvement comprising, means for detecting the change of direction of fluid flow passing through said blades, and means for indicating said directional change.

13. The meter of claim 12 wherein said means for detecting the change of direction of fluid flow comprises a directional pitot tube adapted to be inserted through a wall of said housing downstream of said rotor, said pitot tube being connected to differential pressure measuring means.

14. The meter of claim 12 wherein said means for indicating said directional change comprises a shaft angle encoder for determining the rotational position of said means for detecting the change of direction of fluid flow.

15. A method of ascertaining the accuracy of a meter comprised of a rotatable measuring turbine wheel having turbine blades comprising the steps of:
 (a) initially calibrating said meter;
 (b) measuring the exit angle of fluid flow downstream of said turbine wheel;
 (c) subsequently measuring the exit angle of fluid flow downstream of said turbine wheel when it is desired to check the accuracy of said meter;
 (d) comparing the two values of the exit angle so obtained to give an indication of the change in the accuracy of said meter as indicated by the change in the value of said exit angle.

16. A method of recalibrating a meter of the type having a housing including a passage therethrough, a vane having at least one blade in the passage rotated by fluid flowing therethrough, and means for indicating the quantity of fluid flowing through the passage as a fraction of vane rotation, the meter exhibiting an original exit angle of fluid departing the blade and an original meter coefficient when the meter is initially calibrated, comprising the steps of:
   (a) measuring the exit angle of fluid departing the blade after the meter has been in use for a period of time; and
   (b) correcting the original meter coefficient as a fraction of the original exit angle and the measured exit angle.

* * * * *

UNITED STATES PATENT AND TRADEMARK OFFICE
CERTIFICATE OF CORRECTION

PATENT NO. : 4,091,653

DATED : May 30, 1978

INVENTOR(S) : Winston F. Z. Lee

It is certified that error appears in the above-identified patent and that said Letters Patent are hereby corrected as shown below:

Column 1, line 7, delete "turbinetype" and insert -- turbine type--

Column 1, line 63, delete "The" and insert --These--.

Column 2, line 36, after "of", first occurence, insert --a portion of--.

Column 6, line 16, delete "6" and insert --7--.

Signed and Sealed this

Twenty-sixth Day of December 1978

[SEAL]

Attest:

RUTH C. MASON
*Attesting Officer*

DONALD W. BANNER
*Commissioner of Patents and Trademarks*